(12) United States Patent
Tuan et al.

(10) Patent No.: US 9,089,116 B2
(45) Date of Patent: Jul. 28, 2015

(54) FISH FOOD DISPENSER

(71) Applicants: Ling Liu Tuan, Bountiful, UT (US); Charles T. Tuan, Bountiful, UT (US)

(72) Inventors: Ling Liu Tuan, Bountiful, UT (US); Charles T. Tuan, Bountiful, UT (US)

(*) Notice: Subject to any disclaimer, the term of this patent is extended or adjusted under 35 U.S.C. 154(b) by 90 days.

(21) Appl. No.: 13/796,749

(22) Filed: Mar. 12, 2013

(65) Prior Publication Data
US 2014/0261214 A1 Sep. 18, 2014

(51) Int. Cl.
*A01K 61/02* (2006.01)

(52) U.S. Cl.
CPC ...................................... *A01K 61/025* (2013.01)

(58) Field of Classification Search
USPC ............................................... 119/264, 51.04
See application file for complete search history.

(56) References Cited

U.S. PATENT DOCUMENTS

| | | | |
|---|---|---|---|
| 2,988,312 A | 9/1959 | Dumas | |
| 2,961,994 A | 11/1960 | Kopietz | |
| 2,984,208 A | 5/1961 | Kopietz | |
| 3,208,090 A | 9/1965 | Roesel | |
| 3,499,526 A * | 3/1970 | Willinger | 426/115 |
| 4,175,513 A | 11/1979 | Roehrick | |
| 4,787,336 A | 11/1988 | Lineberry | |
| 4,977,637 A | 12/1990 | Demers | |
| 5,067,059 A | 11/1991 | Hwang | |
| 5,067,060 A | 11/1991 | Sieracki | |
| 5,361,195 A | 11/1994 | Chen | |
| 5,515,570 A | 5/1996 | Muscroft | |
| 5,778,824 A * | 7/1998 | Musgrave et al. | 119/230 |
| 5,988,109 A | 11/1999 | Rofen | |
| 6,070,554 A | 6/2000 | Wilson | |
| 6,109,210 A | 8/2000 | Nasser | |
| 6,314,910 B1 | 11/2001 | Tracy | |
| 6,348,104 B1 | 2/2002 | Bakker | |
| 7,059,270 B1 | 6/2006 | Loginov | |
| 7,506,612 B2 | 3/2009 | Enoch, III et al. | |
| 7,784,428 B2 | 8/2010 | Deng | |
| 8,065,975 B2 * | 11/2011 | Allis | 119/264 |
| 8,161,909 B2 | 4/2012 | Sprung | |
| 8,166,921 B2 | 5/2012 | Biggs | |
| 2007/0107665 A1 | 5/2007 | Enoch, III et al. | |
| 2007/0193525 A1 | 8/2007 | Vaccari | |
| 2007/0279900 A1 | 12/2007 | Bauer et al. | |
| 2009/0147502 A1 | 6/2009 | Aleman | |
| 2009/0250011 A1 | 10/2009 | Biggs | |

(Continued)

FOREIGN PATENT DOCUMENTS

EP 1139729 7/2000
GB 2105977 4/1983

OTHER PUBLICATIONS

Pages from www.acquariumguys.com printed on Feb. 6, 2013, 8 pages.

(Continued)

*Primary Examiner* — Kristen C Hayes
(74) *Attorney, Agent, or Firm* — Workman Nydegger

(57) ABSTRACT

A fish food dispensing assembly includes (i) a handle member; and (ii) a perforated container that is selectively, magnetically linked to the handle member with an aquarium panel therebetween. The perforated container is configured to receive fish food therein and to dispense fish food therefrom in a liquid environment. The fish food dispensing assembly also acts as a cleaner and can be moved with respect to the aquarium in order to clean the aquarium and/or position the fish food dispensing assembly in desired locations for feeding fish within the aquarium.

24 Claims, 10 Drawing Sheets

(56) References Cited

U.S. PATENT DOCUMENTS

| | | | |
|---|---|---|---|
| 2010/0116217 A1* | 5/2010 | Allis | 119/264 |
| 2011/0056437 A1 | 3/2011 | Sprung | |
| 2012/0060763 A1 | 3/2012 | Lin | |
| 2012/0285057 A1 | 11/2012 | Pearce | |

OTHER PUBLICATIONS

The International Search Report and the Written Opinion of the International Search Authority, or the Declaration, PCT Application PCT/US13/31305 dated May 29, 2013, 17 pages.

Top Fin Small Magnet Cleaner, packaging and device, publicly available, and sold at least as early as Feb. 2012, (12 pages).

Top Fin Medium Magnet Cleaner, packaging and device, publicly available, and sold at least as early as Feb. 2012, (9 pages).

Mag Float, Floating Aquarium Cleaner, packaging and device, publicly available, and sold at least as early as Feb. 2012, (9 pages).

Aqua Tech, Magnetic Algae Remover, packaging and device, publicly available, and sold at least as early as Feb. 2012, (10 pages).

The International Search Report and the Written Opinion of the International Searching Authority, or the Declaration, PCT Patent Application No. PCT/US13/78109 dated Mar. 28, 2014 (15 pages).

Pages from elivepet.com, printed on Apr. 16, 2014 (26 pages).

Photos of Logitech computer mouse with laser, which was publicly available and sold at least as early as Feb. 2013, on information and belief (12 pages).

http://www.aquariumguys.com/magfloat350.html; Aquarium Guys; Mag Float-350 Magnetic Glass Cleaner; printed Feb. 6, 2013 (3 pages).

http://www.aquariumguys.com/magnetcleaner2.html; Aquarium Guys; Hagen Extra Large Algae Magnetic Cleaner; printed Feb. 6, 2013 (3 pages).

http://www.aquariumguys.com/magnetscraper.html; Aquarium Guys; Penn Plax Magnet Scraper; printed Feb. 6, 2013 (3 pages).

http://www.aquariumguys.com/glasscare-brush.html; Aquarium Guys; Glasscare Brush for Magnetic Algae Cleaners; printed Feb. 6, 2013 (3 pages).

http://www.aquariumguys.com/magfloat-30-acrylic-cleaner.html; Aquarium Guys; Mag Float-30 Magnetic Cleaner for Acrylic; printed Feb. 6, 2013 (3 pages).

http://freshaquarium.about.com/od/feedingfis1/a/feedingrings.htm; About.com; Shirlie Sharpe; Fish Feeding Rings; printed Feb. 7, 2013 (1 page).

0040080 with two page search report, WO, Jul. 13, 2000, Bakker Holding Son B.V.

http://www.new-era-aquaculture.com/fish-food/marine-range/mini-marinegrazer; New Era Aquaculture; Mini MarineGrazer; printed Feb. 7, 2013 (4 pages).

http://www.fishtanksdirect.com/newera110gramminimarinegrazer.aspx; New Era 110 Gram Mini Marine Grazer; printed Feb. 7, 2013 (4 pages).

http://www.bigalspets.com/cone-worm-feeder.html?utm_source+Google=Products&utm_ca . . . ; Big Al's Online; Lee's Cone Worm Feeder; printed Feb. 7, 2013 (1 page).

Google Image Result for http://reefbuilders.com/files/2011/09/mini-marine-grazer-2.png; Google Image Result, printed Feb. 7, 2013 (1 page).

http://www.youtube.com/watch?v=ZB-IwIv3nLw; YouTube: New Era mini Marine Grazer; printed Feb. 7, 2013 (3 pages).

http://www.arcatapet.com/item.cfm?cat=455&source=GA-PLA005455; Arcata Pet Supplies; Worm Fish Feeder 4-way Ring and Cone; printed Feb. 7, 2013 (1 page).

Google Image Result for http://blog.aquanerd.com/wp-content/uploads/2012/03/New-Era-MarineGrazer.jpg; Google Image Result, printed Feb. 7, 2013 (1 page).

Google Image Result for http://reefbuilders.com/files/2011/09/mini-marine-grazer-4.png; Google Image Result, printed Feb. 7, 2013 (1 page).

http://blog.aquanerd.com/2012/10/new-era-aquaculture-to-release-smaller-mini-marinegrazer.html; Brandon Klaus; Reef Aquarium and Saltwater Hobbyist Blog; New Era Aquaculture to Release Smaller Mini MarineGrazer; printed Feb. 7, 2013 (9 pages).

http://www.aquariumguys.com/magnetic-cleaners.html; Aquarium Guys; Magnetic Aquarium Cleaners; printed Feb. 6, 2013 (3 pages).

The International Search Report and The Written Opinion of the International Searching Authority and Search History from International Application No. PCT/US2014/039922 dated Jan. 23, 2015 (18 pages).

PCT Recordation of Search History, International Application No. PCT/US13/78109, accompanying International Search Report dated Mar. 28, 2014 (10 pages).

Invitation to Pay Additional Fees and, Where Applicable, Protest Fee from PCT/US2014/039922, dated Sep. 24, 2014 (2 pages).

U.S. Appl. No. 14/142,500, May 19, 2015, Office Action.

* cited by examiner

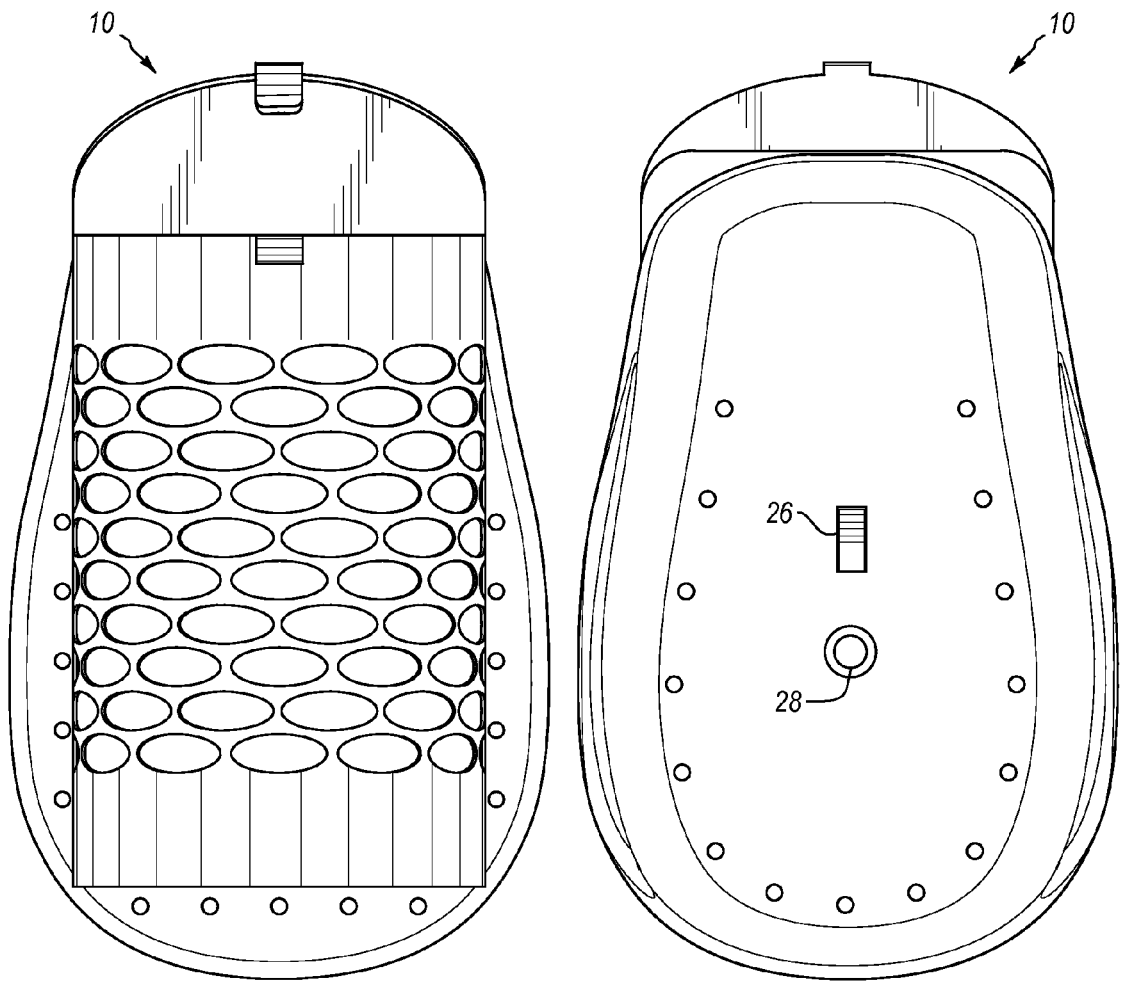
*FIG. 2*        *FIG. 3*

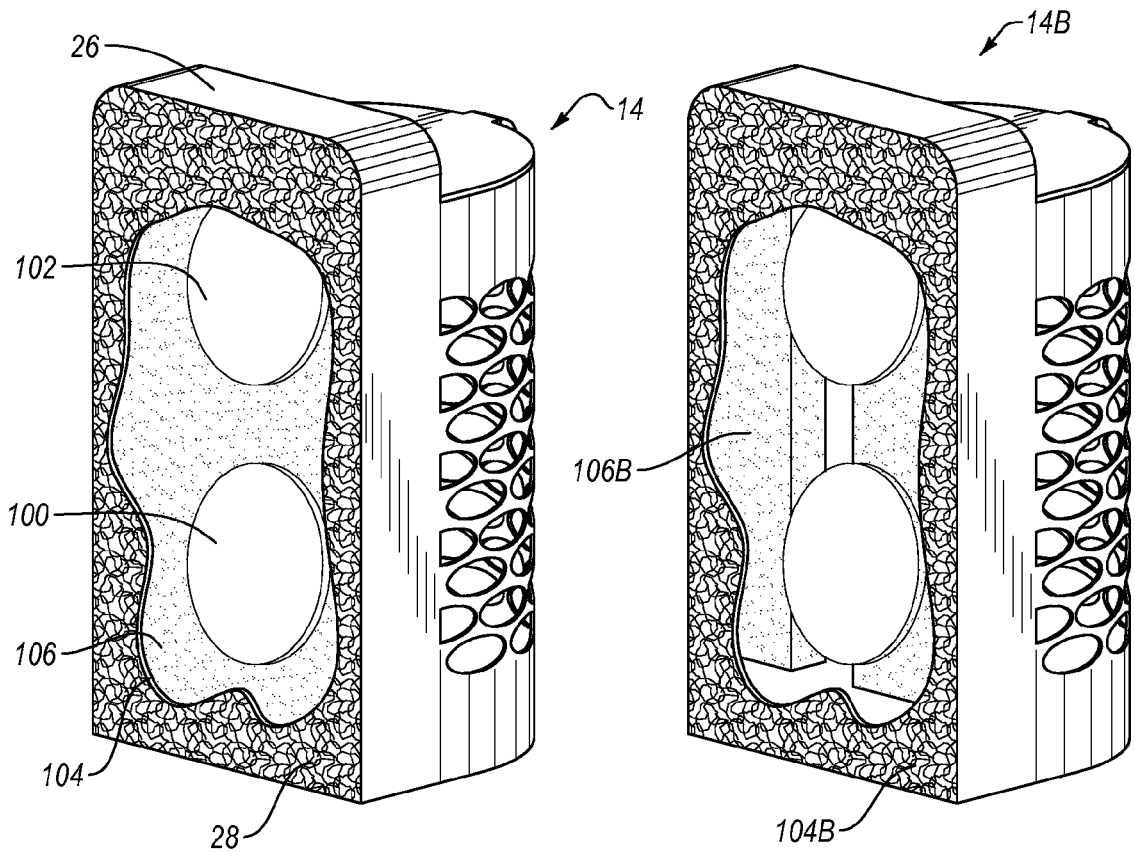
*FIG. 11A*  *FIG. 11B*
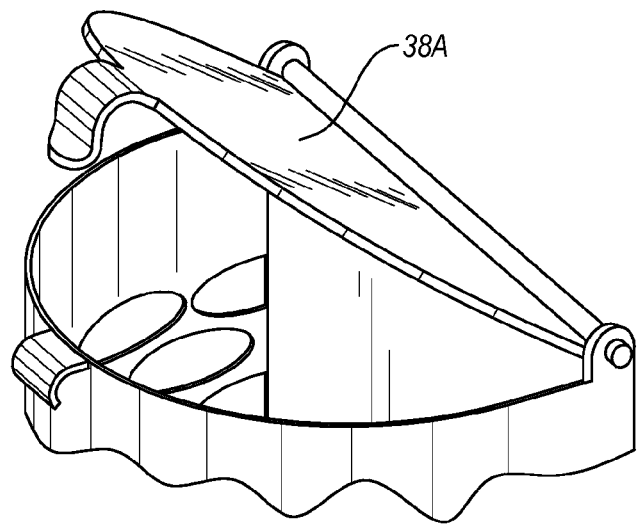
*FIG. 12*

FISH FOOD DISPENSER

BACKGROUND OF THE INVENTION

1. The Field of the Invention

This invention is in the field of aquariums and related devices.

2. The Relevant Technology

Fish aquariums are popular in home, commercial, agricultural, and industrial settings, providing educational and recreational experiences and food sources. Aquariums are designed to form habitat in which marine life, including fish, can exist and thrive for the benefit of a home, business and community. One benefit of having an aquarium filled with marine life is the opportunity to view and interact with the marine life in a setting distant from oceans, lakes and rivers, for example.

A primary aspect of the creation and maintenance of a marine habitat is providing sufficient nutrients in the form of food for the marine wildlife, in proper quantities and proportion, such that the marine life will be sustained, prosper and thrive. Another responsibility is to maintain the aquarium in a clean, fragrant and presentable fashion.

Commonly, the goal of feeding and maintaining the environment of marine wildlife is complicated by the need to maintain a clean aquarium environment. If left unattended, an aquarium becomes crowded, dirty, and shrouded in unwanted films.

Another problem relating to the feeding of fish is that certain fish food, e.g. pellets, are often of a hard type that may injure the inside of a fish's mouth. Some fish swallow food without chewing it first, which can cause injuries, particularly with such hard food.

It is therefore desirable to develop systems and technologies that encourage and enhance the ability of an aquarium caretaker to feed marine life in a suitable and proper manner. It is also desirable to have cleaning systems that encourage the convenient and thorough cleaning of an aquarium.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 2 demonstrates assembly 10 of FIG. 1A in a front view.

FIG. 3 demonstrates assembly 10 of FIG. 1A in a rear view.

FIGS. 11A and 11B demonstrate cut away views of alternate perforated containers containing a foam material, which causes the containers to float in an aquarium when magnetically disengaged from the handle member.

FIG. 12 shows another example of a lid 38a movably coupled to the plate of a perforated container of the present invention.

DETAILED DESCRIPTION OF THE PREFERRED EMBODIMENTS

Figure 1:
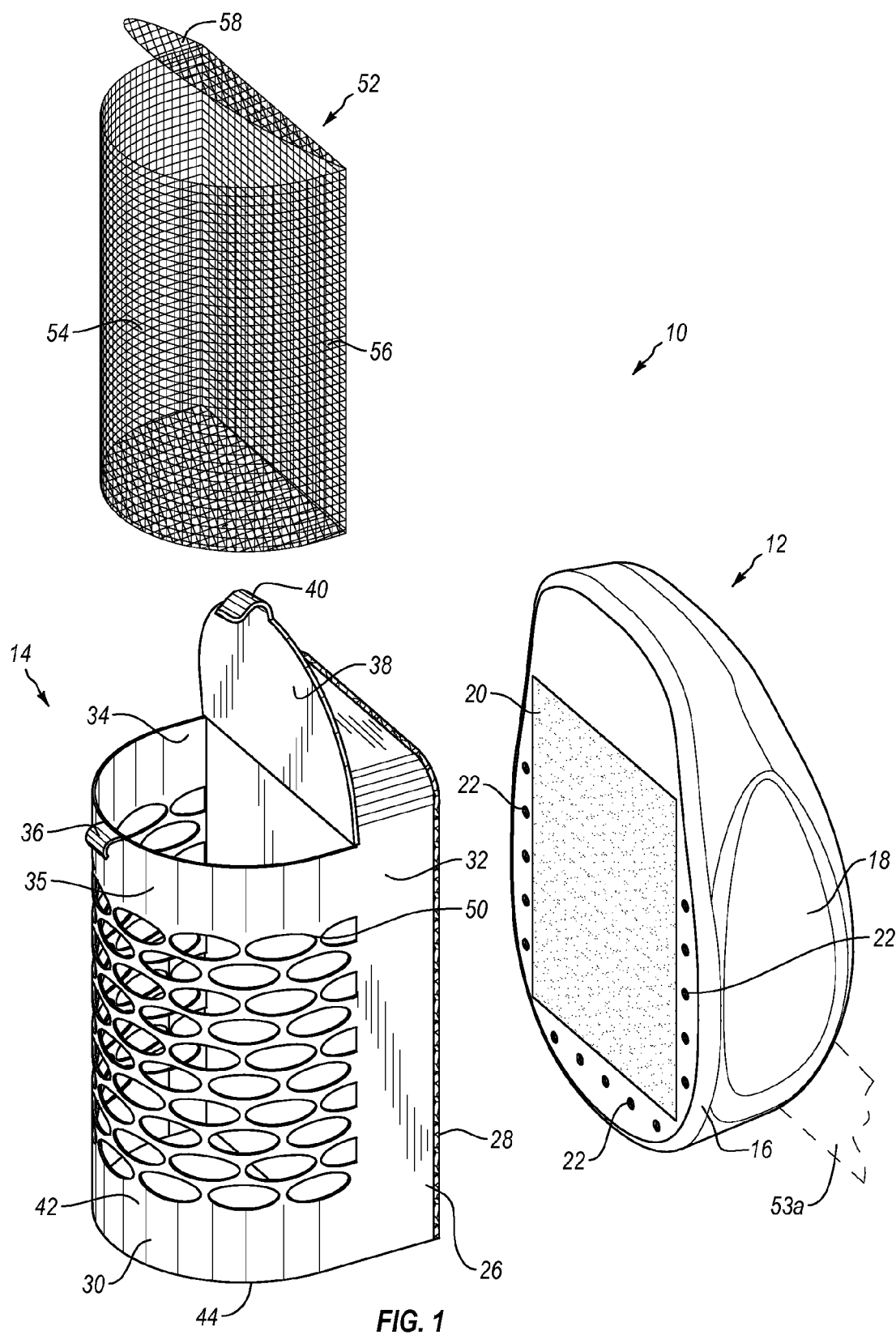
FIG. 1 demonstrates a fish food dispensing assembly 10 of the present invention, assembly 10 being shown in an exploded view.

FIG. 1 shows a fish food dispensing assembly 10 of the present invention. Assembly 10 comprises a handle member 12 and a perforated container 14, that are selectively, magnetically linked to each other while on opposite sides of a panel of a fish aquarium in order to clean and/or dispense food from perforated container 14 in a liquid environment (such as water). In light of the magnetic coupling, the position of container 14 can be selectively moved by moving handle 12. Liquid within an aquarium moistens fish food within the perforated container 14 and moves the fish food out of perforations in the perforated container 14.

Handle member 12 comprises a substantially flat plate 16, having an ergonomic grip 18 coupled thereto (e.g. integrally extending therefrom) for grasping handle member 12, and placing handle member 12 adjacent the panel of the aquarium. In one embodiment, a soft cleaning material 20 configured to clean and shine an aquarium panel, such as felt, cloth, textile or other non-scratch material is mounted on plate 16 in order to shine the panel of the aquarium, which may be comprised of a transparent or translucent material such as glass, plastic or other material suitable for containing liquid and visualizing marine life there-through, for example.

Plate 16 has light sources 22, e.g., light emitting diodes mounted about the peripheral surface thereof in order to attract fish toward assembly 10 where the food is and/or illuminate an aquarium. Toggle switch 26 (FIG. 3) can be used to activate light source 22 and/or rear light source 28 (FIG. 3) mounted within grip 18 which shines into a room outside the aquarium, for example. One or more batteries for light sources 22, 28 may be mounted within grip 18, for example, and electrically coupled to switch 26 and light sources 22, 28. Rather than a toggle switch 26, the switch to activate lights 22, 28 may be a rounded rotating wheel switch, one or more button switches or a variety of different switches. A remote control may optionally be used to activate light sources 22, 28.

Assembly 10 thus comprises one or more light sources 22 on the handle for illuminating the inside of the aquarium and/or rearwardly away from the aquarium. Plate 16 of the handle member 12 is greater in size than a plate 26 of the perforated container 14. One or more light sources 22 are located on the rim of the plate 16, such that the one or more lights shine past the perforated container 14 into the aquarium during use.

One or more light sources such as light source 28 and/or similar to light source 28 may be on the grip 18 for illuminating outside of the aquarium. Light source 28 may be a light emitting diode, for example.

Returning to FIG. 1, perforated container 14 comprises a substantially flat plate 26 which is configured to be mounted on the opposing side of the aquarium from handle member 12. Plate 26 has mounted thereon a brush 28, formed from bristles, cloth or other brushing material suitable for cleaning the inside surface of an aquarium panel when handle 12 is magnetically linked to container 14 is moved with respect to the aquarium.

On the opposing sides of plate 26, a curved, perforated panel 30 having apertures 50 is mounted with one side 32 of panel 30 being mounted on one end of plate 26 and an opposing side 34 of perforated panel 30 being mounted on the other end of plate 26, with panel 30 spaced from plate 26, thereby forming a cage for receiving fish food, as shown. Perforated panel 30 comprises a top non-perforated soaking shield 35 and a bottom non-perforated soaking shield 42 with perforations 50 positioned between top shield 35 and bottom shield 42. A tab member 36 is mounted at a top end of soaking shield 35 on a central edge thereof. Adjacent the top edges of panel 30, a lid 38 is movably connected to plate 26.

A clasp 40 is mounted on lid 38 so as to selectively lock lid 38 in a closed position when clasp 40 is closed against tab 36 when lid 36 is selectively, pivotally moved into a closed position, thereby selectively maintaining food within perforated container 14 except when the food exits through perforations 50. Soaking shields 35, 42 are used to retain floating or sinking food, respectively, within container 14 until the food is wet enough to disintegrate and float through openings 50. Mounted below perforated panel 30 is a floor panel 44.

As further shown in FIG. 1, container 14 includes in the perforated panel 30 thereof openings 50 that allow fish food to be dispersed therefrom in a liquid environment. In the event that a user desires to employ on a selective basis smaller openings in order to capture and selectively release less or smaller fish food in a particular instance, a supplemental cage 52 can be placed within perforated container 14, such metal cage 52 having smaller openings 54 in the cage body 56 thereof. Cage body 56 also has a hinged lid 58 in order to retain food within supplemental cage 52 that is too large to fit through openings 54. Lid 58 can be locked against body 56 with a wire, for example, or other locking mechanism or can be compressed closed by lid 38, for example.

Figure 1A:
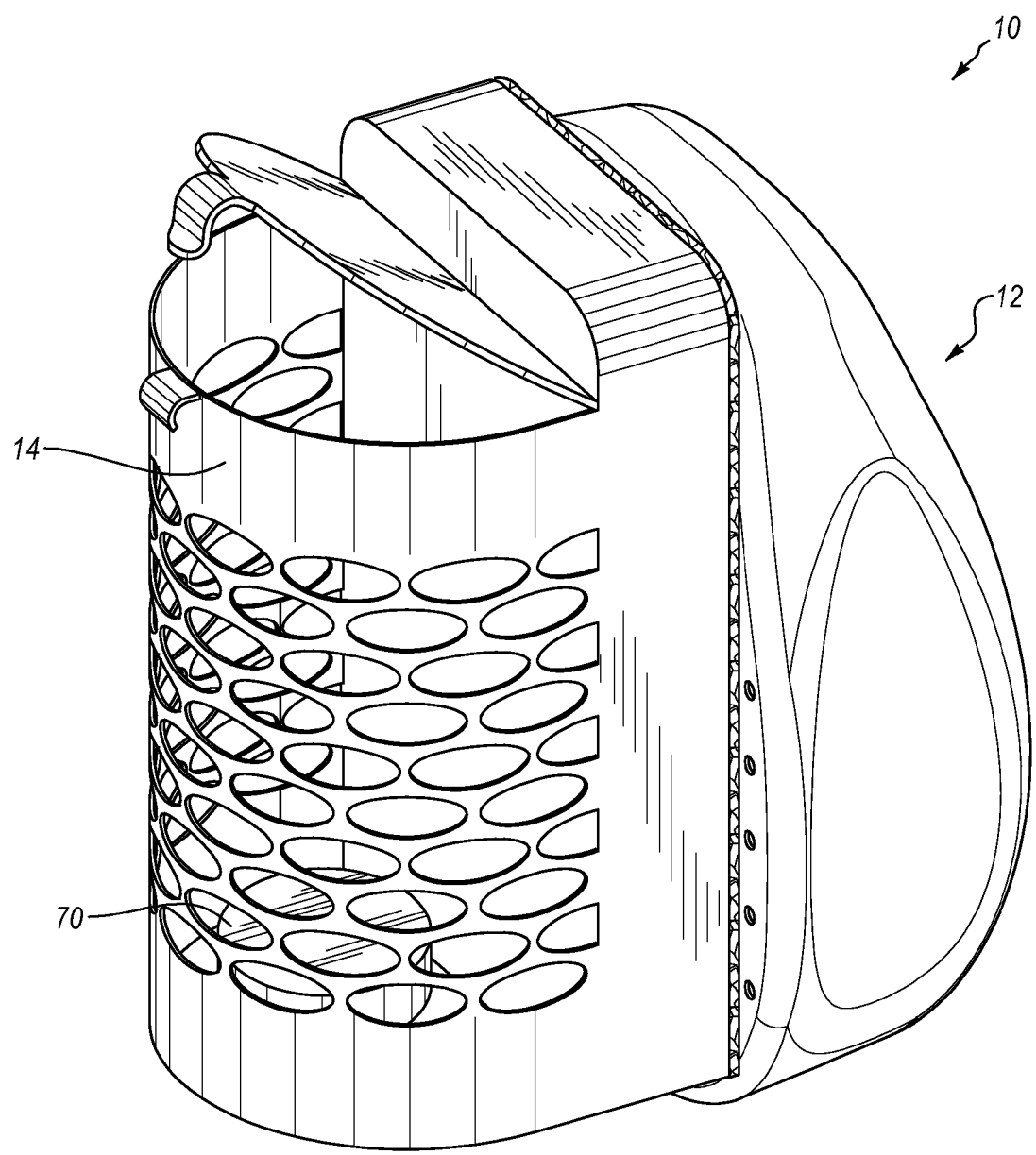
FIG. 1A demonstrates fish food dispensing assembly 10 in a magnetically coupled, perspective view without the supplemental cage 52 of FIG. 1.
Figure 4:
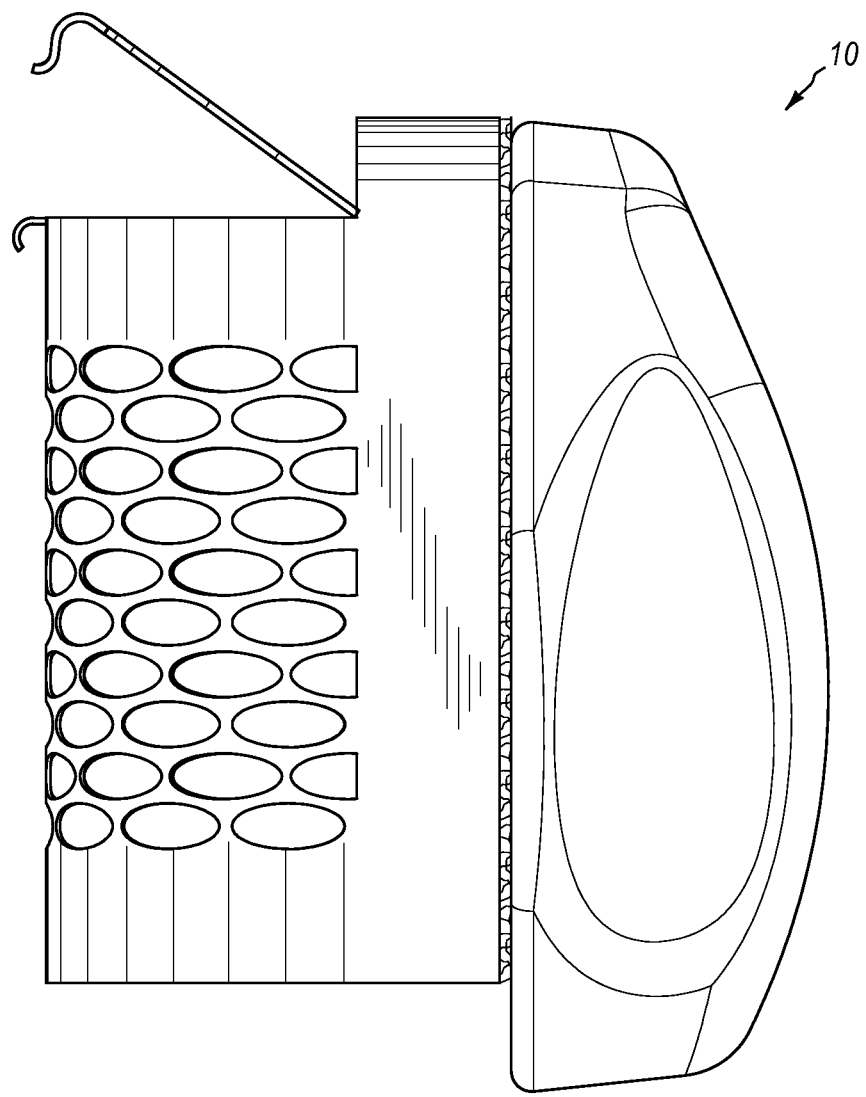
FIG. 4 demonstrates assembly 10 of FIG. 1A in a side view with FIG. 5 being an opposing side view thereof.
Figure 5:
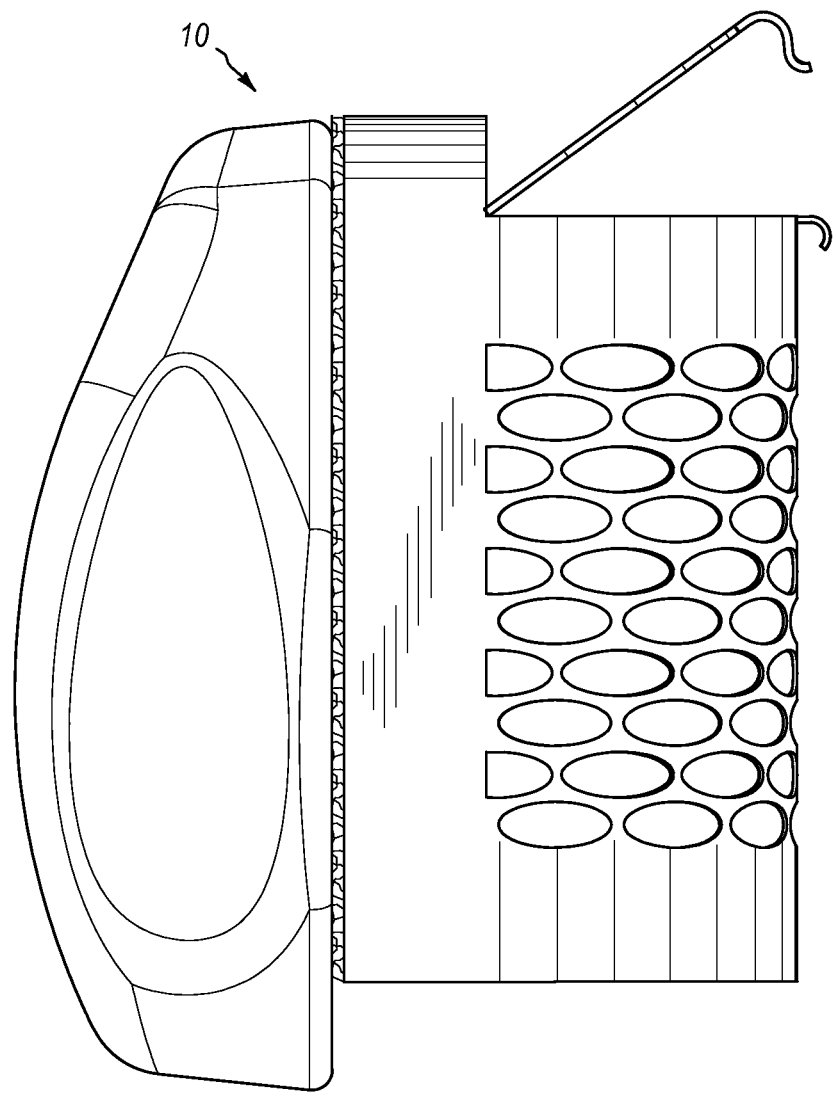
Figure 6:
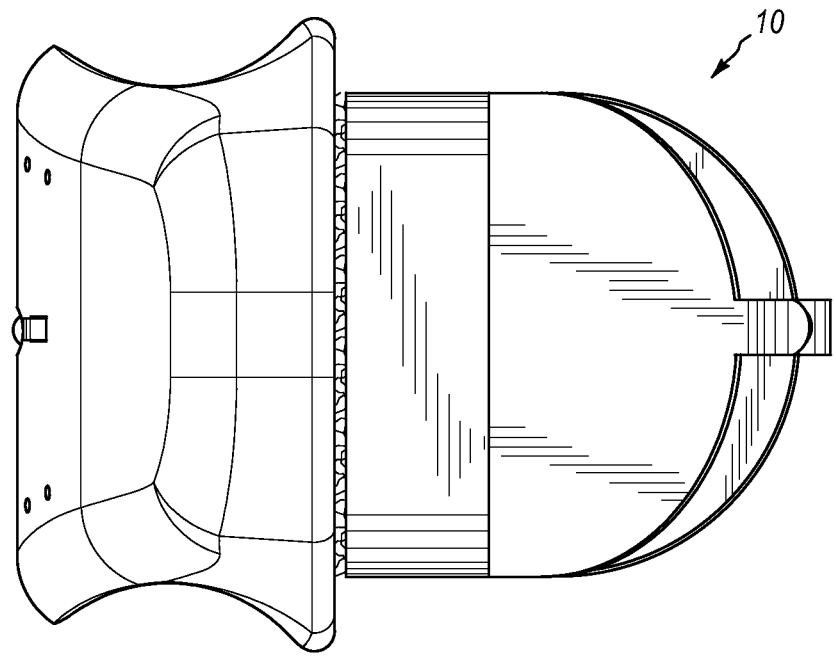
FIG. 6 demonstrates assembly 10 of FIG. 1A in a top view.
Figure 7:
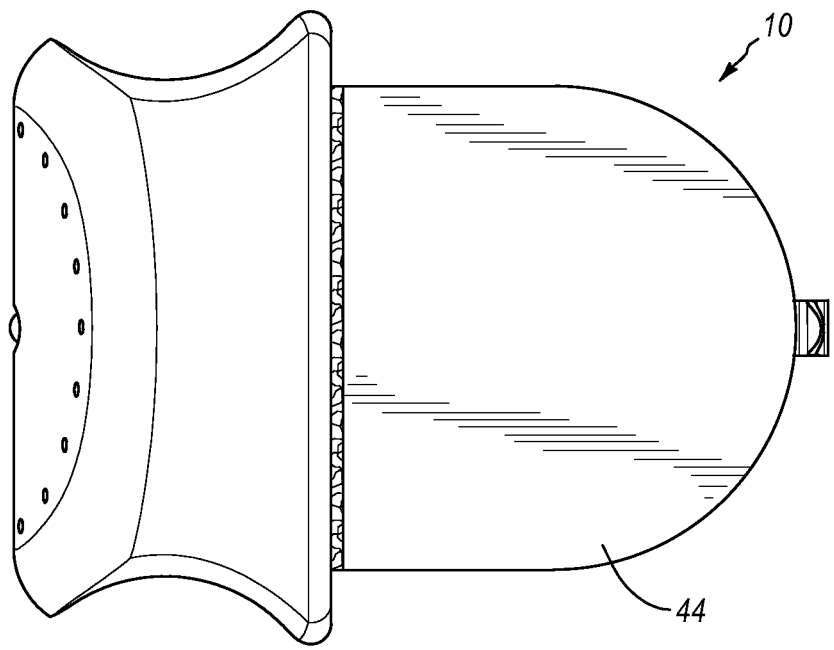
FIG. 7 demonstrates assembly 10 of FIG. 1A in a bottom view.

In one embodiment, plates 16, 26 of handle member 12 and container 14, respectively, contain corresponding magnets with opposing polar relationships such that when handle member 12 and perforated container 14 are in close enough proximity to each other, they become magnetically coupled to each other in a desired aligned relationship, as shown for example, in FIG. 1A.

Figure 8:
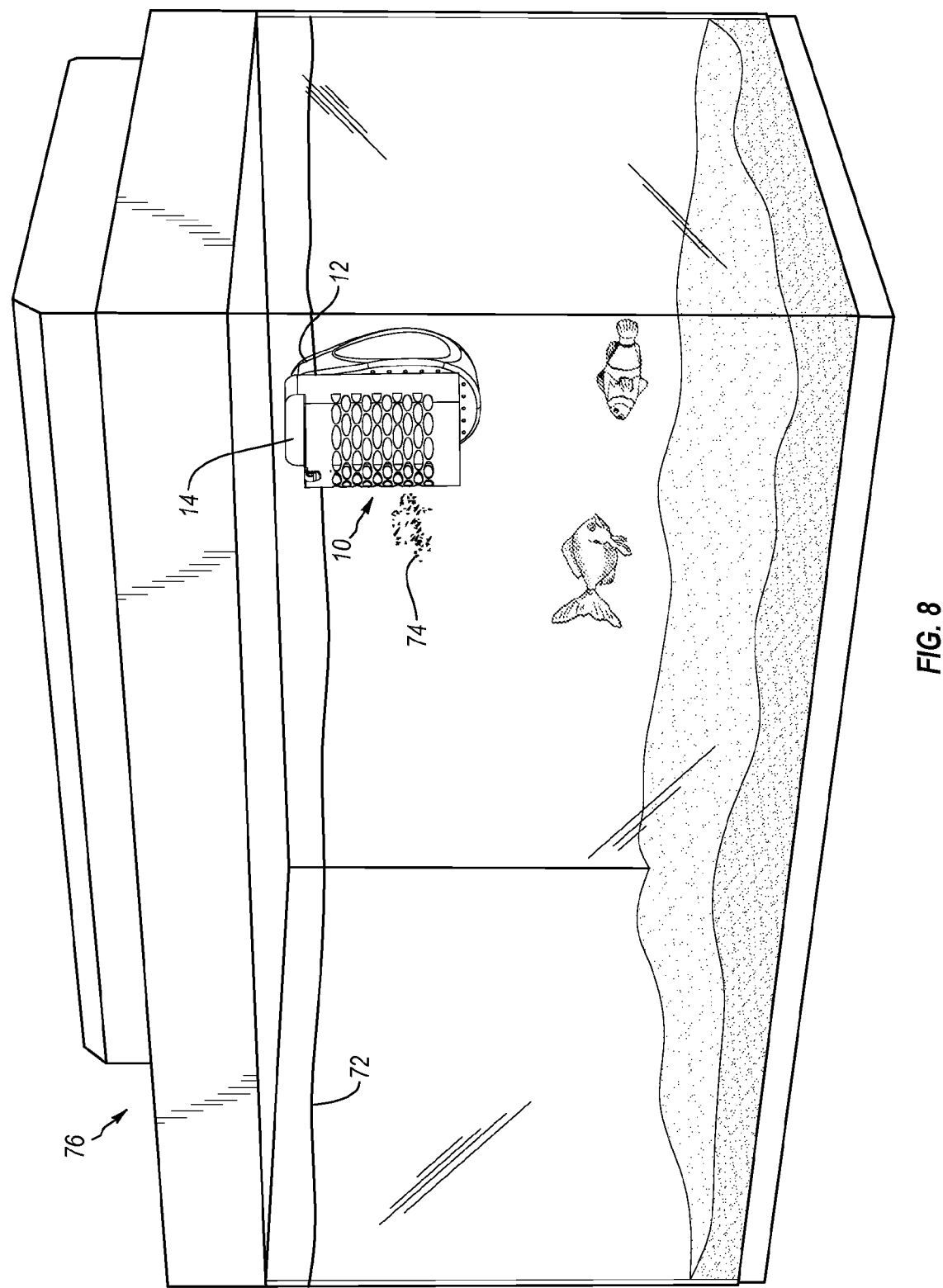
FIG. 8 demonstrates use of fish food dispensing assembly 10 mounted on an aquarium with the handle member and perforated portion magnetically linked to each other through a panel of the aquarium. Dispensing assembly 10 is shown in a vertical position with respect to the aquarium.

When handle 12 is placed on one side of a panel (e.g., glass or plastic transparent panel) of an aquarium and perforated container 14 is placed on an opposing side of the panel adjacent handle 12, a magnetic linkage occurs such that handle 12 and container 14 are magnetically linked to each other and to the panel adjacent to each other with handle 12 on one side and container 14 on the other. Then, upon moving handle 12, container 14 moves in the same direction as handle 12. Thus, when container 14 is placed inside an aquarium and handle 12 is placed outside the aquarium adjacent container 14, as shown in FIG. 8, brushing surface 28 of container 14 is positioned against the inside of an aquarium panel and shining surface 20 handle 12 is positioned against the outside of the panel, such that movement of handle 12 magnetically linked to the container 14 will operate to brush and clean the inside of the panel and shine the outside of the aquarium panel. Wherever the handle 12 is moved, the container 14 follows such that convenient brushing, cleaning, and shining takes place.

As shown in FIG. 1A, a fish food pellet 70 can be placed within perforated container. Upon placement of fish food pellet 70 in container 14, lid 38 of assembly 10 can be closed and assembly 10 can be moved to a desired location within an aquarium. By positioning assembly 10 into a desired location with respect to the aquarium, fish food pellet 70 can thus be selectively positioned within the aquarium so as to feed at a desired location within the aquarium.

For example, if it is desired to feed in a left lower corner, assembly 10 can be moved to that location without the user's hands touching the liquid such that the fish food pellet 70 can be specifically located there for bottom-feeding fish, for example. Or, if it is desired to place the container in an upper portion for top-feeding fish, assembly 10 containing pellet 70 can be moved to that location by moving handle 12 to that location, which will correspondingly drag container 14 to that desired location.

As shown in FIG. 8, for example, assembly 10 is mounted in a vertical position near the top of the aquarium adjacent water level 72. Disintegrated portions 74 of pellet 70 are shown in FIG. 8 as being released within aquarium in a desired location. If it is desired to feed fish at a lower location e.g. for bottom feeding fish, assembly 10 can be moved to the lower location, for example, by moving handle 12 magnetically coupled to perforated container 14. This simultaneously moves assembly 10 to a desired location and correspondingly cleans the aquarium during such movement.

In yet another embodiment, the cleaning and feeding operations can be performed separately. For example, in one embodiment, assembly 10 is mounted on the aquarium with container 14 on the inside and without any food therein, after which the assembly 10 is moved with respect to the aquarium, thereby cleaning the aquarium. Next, assembly 10 is removed from the aquarium, or moved adjacent the water level, as shown in FIG. 8, after which food is placed therein. Assembly 10 is then allowed to feed the fish or is moved into a certain desired position for feeding fish.

By placing fish food within perforated container 14 and releasing it through perforations 50 of container 14, the fish food can be dispersed incrementally, preventing the fish from biting and swallowing large chunks of food or fish pellets which may have sharp edges and which may be too large for a fish's mouth or stomach. Food dispersed from container 14 cannot be larger than perforations 50. By thus requiring the fish food to disperse through certain sized apertures 50 by the dissolving power of the liquid water, the fish food size can be controlled so as to be dispersed in small enough chunks that are more amenable to fish's eating habits and less damaging to the fish's mouth and intestinal system.

Figure 9:
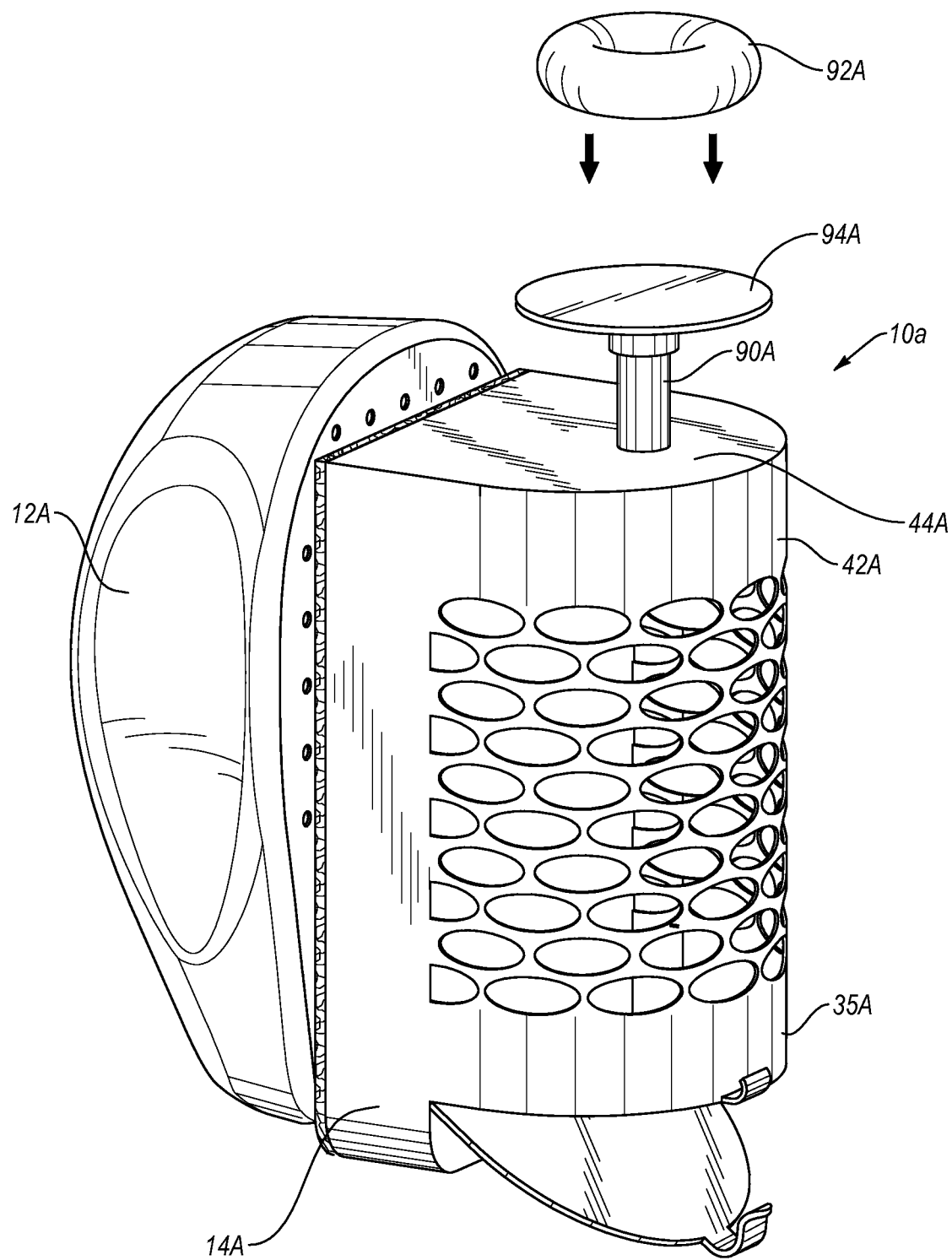
FIG. 9 demonstrates an alternative fish food dispensing assembly of the present assembly having a cylindrical fish food mounting post mounted on a bottom plate thereof.
Figure 10:
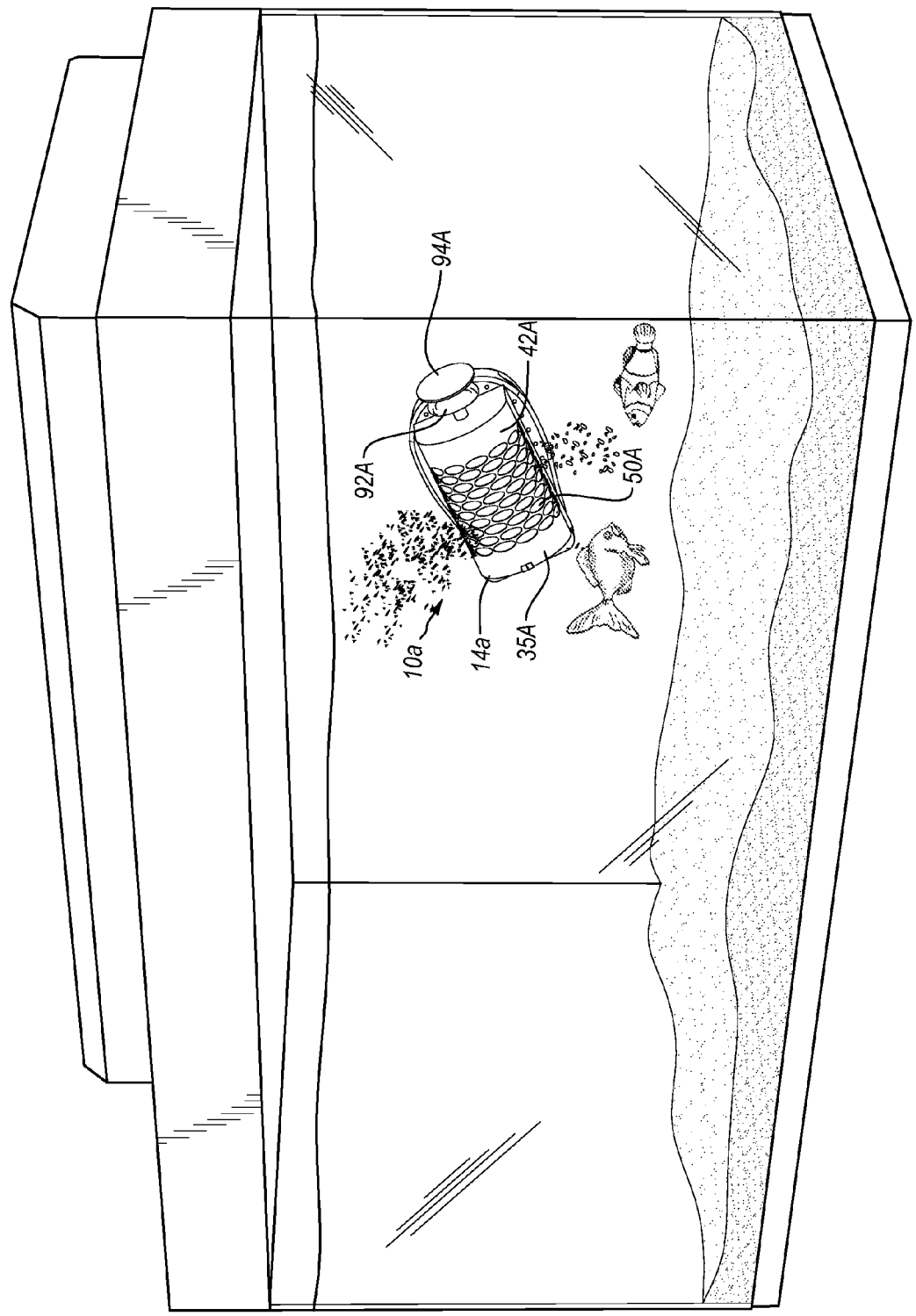
FIG. 10 demonstrates the fish food dispensing assembly of FIG. 9 mounted through magnetic linking on a panel of an aquarium. Dispensing assembly 10A is shown in FIG. 10 in a slanted position with respect to the aquarium.

With reference now to FIG. 9 in yet another embodiment, a mounting post 90A can be mounted in the floor panel 44A of a container 14A, which may be the same or similar to container 14, for example, in order to provide an opportunity to move a perforated or doughnut shaped fish food pellet 92A or other object into a desired location within the aquarium as reflected in FIG. 10. In such a manner, the pellatized food 92a is disbursed in a selected location. In addition, use of post 90A enables a user to introduce food, e.g. a perforated pellet 92A into an aquarium filled with water without getting the user's hands wet, among other benefits. Post 90A can be used to hold any object having a hole therethrough, such as a seaweed clipper, for example, which can be readily moved around the aquarium by being mounted on post 90A. Lid 94a can be used to maintain pellet 92a on post and may be selectively, threadedly or press fit coupled to post, for example.

By moving container 10 or 10A to a desired location and disbursing food as desired, it is possible to more specifically place food into a more desired location as opposed to randomly placing the food. After installing pellet 92A onto post 90A, container 14A is readily moved into the water, without requiring the user to get the user's hands wet.

One exemplary method of feeding fish, which can be accomplished through the use of assembly 10 and/or assembly 10A, for example, is to initially place food, e.g. food pellet 70 (see FIG. 1A) within container 14, and closing lid 38, such that pellet 70 is partially shielded from dispersal in the water by either lower soaking plate 42 (in the case of sinking food, which will sink to the bottom of container 14) or upper soaking plate 35 (in the case of floating food, e.g., frozen food, which will float to the top of container 14), then mounting container 14 in a vertical position within water held within an aquarium such that container 14 and handle 12 are magnetically linked to each other with a panel of aquarium therebetween, such as shown in FIG. 8. While in the vertical position of FIG. 8, water within the aquarium will soften the food pellet 70 or a chunk or other portion of food and cause it to begin to disintegrate, but plate 42 or 35 will at least somewhat prevent the food from seeping out of container 14 into the water.

Then, upon moving handle from the vertical position of FIG. 8, for example, by turning the handle 12 in a clock-wise direction, e.g., about 235 degrees from the vertical position, container 14 (or 14A) is in a slanted position, such that floating food initially located in the top floats out of perforations 50 and sinking food initially located in the bottom likewise floats out of perforations 50. This slanted position is shown with respect to assembly 14A in FIG. 10, which is positioned about 235 degrees from the original vertical position, rotated clockwise.

One benefit of such approximately 235 degree or 225 degree rotation, for example, is that floating food initially located adjacent top panel 35 is then positioned at the bottom of the perforated container 14 and floats upwards through holes 50 and sinking food initially at the bottom of the perforated container 14 adjacent bottom panel 42 is then positioned at the top of the perforated container 14 and sinks downward through holes 50. However, any amount of rotating movement of assembly 10 from the vertical position of FIG. 8 to a slanted position that causes more food to be released through the perforations 50 can be sufficient to enhance the dispersal of food to the fish.

With reference to FIGS. 9 and 10, prior to rotating handle 12A, and therefore container 14A, food within container 14A is protected by top plate 35A and/or bottom plate 42A and is allowed to soak within water within the aquarium, thereby softening the food and preparing it for dispersal through perforations 50A. Upon rotating container 14A into the slanted position of FIG. 10, food that is shielded from dispersal by plate 35A or 42A will be begin to move, e.g., through sinking or floating, through the holes 50A as shown in FIG. 10. Thus, upon achieving the slanted position of FIG. 10, food which is now disintegrated and moistened and ready to be eaten in a more healthy manner within the sensitive mouths of fish will float out of holes 50A to be readily eaten by fish, as opposed to hardened food which has not moistened before being eaten.

The size of holes 50A also prevents fish from eating food that is bigger than the size of holes 50A, as opposed to allowing the fish to randomly eat food that is too large and may injure the mouths of the fish. Thus, after softening the food through placement in water and after rotation of container 14a to the slanted position of FIG. 10, softened food previously held in the areas adjacent shield 35 and/or shield 42 will move through the liquid out of apertures 50a for safe eating by fish.

Assemblies 10, 10A can be selectively moved vertically, horizontally and/or rotatably with respect to the aquarium. Optionally, dispensing assemblies 10 and/or 10A may also be turned on its side so that the fish can readily eat from assembly while in a horizontal orientation.

FIG. 11A shows that plate 26 of container 14 contains, in the interior thereof, one or more magnets. Specifically, magnets 100, 102 are located within outer casing 104 of plate 26. Also within casing 104 of plate 26 is a buoyant foam material 106 in sufficient quantity such that container 14 is buoyant and floats in water. Foam material 106 may be a buoyant closed cell extruded polystyrene foam, such as STYROFOAM, for example. Casing 104 of plate 26 may also be airtight in order to increase the buoyant effect of container 14 and cause it to float, but in our embodiment, foam 106 is buoyant enough to cause floatation of container 14 without casing 104 being airtight. This enables flotation even in the event of a perforation.

This floating effect allows a user to grab floating container 14, if it becomes magnetically disengaged from handle 12, without getting the user's hands wet. Thus, upon disconnection from a magnetic linkage, such as by accidentally dropping container 14 in an aquarium, container 14 readily floats, enabling a user to pull it from the water without having to place the user's hand into the bottom of a wet aquarium.

At least one of the handle member and the perforated container have a magnet therein that magnetically attracts the handle member and the perforated container to each other. In one embodiment each of the handle member and the perforated container have one or more magnets therein for accomplishing the desired attraction and relationship.

In one embodiment, magnets 100, 102 are oriented with opposite poles on the same side, such that magnet 100 has a north side against foam 106 for example, while magnet 102 has a south side against foam 106, for example. By orienting opposite poles of magnets on the same side of handle 12 in an offsetting relationship, one can enable handle 12 and container 14 to readily align and couple to each other in a desired relationship, such as shown in FIG. 1A, for example, for convenient storage, transportation, and sale.

Magnets 100, 102 may be embedded within the foam 106. Optionally, FIG. 11B shows that foam 106B, which causes container 10B to float, may be in panels of foam within casing 104B.

Advantages of assembly 10 thus include the following: Assembly 10 acts as a useful feeder to feed fish in a calculated, positionable manner without getting a user's hands wet. Assembly 10 simultaneously provides lighting to the interior of an aquarium and/or to a room. Assembly 10 provides the ability to simultaneously clean the inside and outside of the aquarium. Assembly 10 also provides a holder for holding a pellet of food or other object and for positioning the pellet or object in a liquid-filled aquarium without getting the hands of a user wet during such positioning. Assembly 10 acts as a soaker for soaking the food prior to feeding to fish, thus making the food soft and protecting the delicate lining surfaces of a fish's mouth and gastrointestinal tract from the sharp, hard edges of un-moistened food.

Food that is not eaten by the fish can be readily removed from the aquarium if desired by removing container 14 in a magnetically linked vertical motion without requiring the user to place the user's hand in the water. Floating and/or sinking food is trapped inside container 14 until the food either dissolves and moves through perforations 50 or is taken out of the fish aquarium for storage and feeding at a later time. This can prevent overfeeding and can save food that has not moved through perforations for later use.

Fish food in container 14 is allowed to expand in a liquid in a container and disintegrates before it is eaten by the fish, thereby preventing post-eating water expansion within a fish's stomach, which can damage the stomach. After the food is moist and soft, it is easier for the fish to digest and will assist in preventing overeating by the fish because the fish will eat the food while it is wet and expanded. By eating wetter, expanded food, the fish has decreased tendency to overeat. The food can be selectively placed at any height along a container, e.g. an aquarium. Floating food can be prevented by going out the top of the cage and can be kept centrally or lower in the cage as desired. Finally, food sizes are regulated by the sizes of the perforations of the cage(s), which can be selected by the user.

The assembly 10 of the present invention and similar assemblies may be used in connection with any type of container used to hold water. Thus, assembly 10 may be used in a personal, home, agricultural, retail, commercial, industrial application or a variety other types of settings. The aquarium mentioned and claimed herein may be any type of container that holds a liquid, such as water.

As yet another feature of the invention, an elongate extension handle 53a (shown in phantom lines in FIG. 1), such as a broom handle having threads on a tip thereof, may be selectively connected to handle 12 so as to move handle 12 when assembly 10 is located away from the user, such as when an aquarium is on a high shelf or otherwise located to far from the user to reach handling 12 without the use of an extension handle 53a. In one embodiment, extension handle 53a is selectively, threadedly connected to handle 12 or press fit therein or attached thereto with an adhesive.

FIG. 12 shows another example of a lid 38a movably coupled to the plate of a perforated container of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fish food dispensing assembly comprised of:
a handle member; and
a perforated container that is selectively, magnetically linked to the handle member, the perforated container configured to receive fish food therein and to dispense fish food therefrom in a liquid environment, the perforated container configured to be magnetically linked to the handle member with an aquarium panel between the handle member and the perforated container, such that the fish food dispensing assembly can be moved with respect to the aquarium in order to position the fish food dispensing assembly in desired locations for feeding fish within the aquarium; and
further comprising a post mounted on the perforated container, the post configured to receive an object thereon that is desired to be positioned within the aquarium.

2. A fish food dispensing assembly as recited in claim 1, further comprising a supplemental cage that is selectively mounted within the perforated container in order to vary the size of perforations used to retain fish food therein.

3. A fish food dispensing assembly as recited in claim 1, wherein the perforated container includes a brush thereon so that said brush brushes a surface of the panel of the aquarium as the perforated container is moved along the surface of the aquarium panel, thereby cleaning the aquarium panel.

4. A fish food dispensing assembly as recited in claim 1, wherein the fish food dispensing assembly can be adjusted vertically, horizontally, and/or rotatably with respect to a panel of the aquarium.

5. A fish food dispensing assembly as recited in claim 1, wherein the fish food dispensing assembly can be employed to simultaneously dispense food to fish and to clean the panel of the aquarium.

6. A fish food dispensing assembly as recited in claim 1, wherein at least one of the handle member and the perforated container have a magnet therein that magnetically attracts the handle member and the perforated container to each other.

7. A fish food dispensing assembly comprised of:
a handle member;
a perforated container that is selectively, magnetically linked to the handle member, the perforated container configured to receive fish food therein and to dispense fish food therefrom in a liquid environment, the perforated container configured to be magnetically linked to the handle member with an aquarium panel between the handle member and the perforated container, such that the fish food dispensing assembly can be moved with respect to the aquarium in order to position the fish food dispensing assembly in desired locations for feeding fish within the aquarium; and
one or more light sources on the handle member for illuminating the aquarium.

8. A fish food dispensing assembly as recited in claim 7, wherein a plate of the handle is greater in size than a plate of the perforated container, and wherein the one or more light sources are located on the rim of the plate, such that the one or more light sources illuminate past the perforated container into the aquarium.

9. A fish food dispensing assembly comprised of:
a handle member;
a perforated container that is selectively, magnetically linked to the handle member, the perforated container configured to receive fish food therein and to dispense fish food therefrom in a liquid environment, the perforated container configured to be magnetically linked to the handle member with an aquarium panel between the handle member and the perforated container, such that the fish food dispensing assembly can be moved with respect to the aquarium in order to position the fish food dispensing assembly in desired locations for feeding fish within the aquarium; and
one or more light sources on the handle for illuminating outside of the aquarium.

10. A fish food dispenser assembly comprised of:
a handle member;
a perforated container that is selectively, magnetically linked to the handle member, the perforated container configured to receive fish food therein and to dispense fish food therefrom in a liquid environment, the perforated container configured to be magnetically linked to the handle member with an aquarium panel between the handle member and the perforated container, such that the fish food dispensing assembly can be moved with respect to the aquarium in order to position the fish food dispensing assembly in desired locations for feeding fish within the aquarium, the perforated container comprising:
  a plate member; and
  a brush mounted on the plate member such that the brush moves against the aquarium panel when the dispenser assembly is moved with respect to the aquarium; and
a post directly mounted on an exterior surface of the perforated container for receiving fish food configured to be mounted on the post;
wherein the fish food dispensing assembly can be employed to simultaneously dispense food to fish and to clean the panels of the aquarium.

11. A fish food dispenser assembly comprised of:
a handle member;
a perforated container that is selectively, magnetically linked to the handle member, the perforated container configured to receive fish food therein and to dispense fish food therefrom in a liquid environment, the perforated container configured to be magnetically linked to the handle member with an aquarium panel between the handle member and the perforated container, such that the fish food dispensing assembly can be moved with respect to the aquarium in order to position the fish food dispensing assembly in desired locations for feeding fish within the aquarium, the perforated container comprising:
  a plate member; and
  a brush mounted on the plate member such that the brush moves against the aquarium panel when the dispenser assembly is moved with respect to the aquarium; and
a post mounted on an exterior surface of the perforated container for receiving fish food configured to be mounted on the post;
wherein the fish food dispensing assembly can be employed to simultaneously dispense food to fish and to clean the panels of the aquarium;
wherein the post comprises a cylindrical shaped post.

12. A dispenser assembly as recited in claim 11, wherein the cylindrical shaped post is configured such that fish food with a mating aperture therethrough can be mounted on the post by extending the fish food onto the post with the post positioned within the aperture.

13. An aquatic assembly for creating an ecosystem for marine wildlife, the aquatic assembly comprising:
an aquarium configured to contain a liquid therein with marine life existing within the liquid in the aquarium; and
a fish food dispensing assembly configured to be mounted to the aquarium, the fish food dispensing assembly comprising:
  a handle member having light sources thereon for illuminating the aquarium to thereby attract fish toward the dispensing assembly; and
  a floating perforated container that is selectively, magnetically linked to the handle member, the perforated container configured to receive fish food therein and to dispense fish food therefrom in a liquid environment, the perforated container configured to be magnetically linked to the handle member with an aquarium panel between the handle member and the perforated container, such that the fish food dispensing assembly can be moved with respect to the aquarium in order to position the fish food dispensing assembly in desired locations for feeding fish within the aquarium, the perforated container comprising:
    a plate member having a foam material therein that causes the perforated container to float in a liquid;
    a perforated panel mounted on the plate; and
    a brush mounted on the plate member such that the brush moves against the aquarium panel when the dispenser assembly is moved with respect to the aquarium,
  wherein the fish food dispensing assembly can be employed to simultaneously dispense food to fish and to clean the panels of the aquarium.

14. An aquatic assembly as recited in claim 13, wherein the fish food assembly further comprises a supplemental cage having perforations that are smaller than perforations of the perforated container.

15. An assembly as recited in claim 13, further comprising an extension handle coupled to the handle member.

16. A method for dispensing fish food within an aquarium filled with a liquid, comprising:
providing an aquarium filled with a liquid;
providing a perforated container and a handle that are configured to be selectively, magnetically linked to each other;
placing fish food within the perforated container; and
placing the perforated container within the aquarium such that the perforated container is on the inside of the aquarium and the handle is on the outside of the aquarium such that the perforated container and the handle are magnetically linked to each other, and such that the liquid within the aquarium moistens the fish food within the perforated container and moves the fish food out of perforations in the perforated container, wherein the perforated container comprises a bottom soaking shield, which is not perforated.

17. A method for dispensing fish food within an aquarium filled with a liquid, comprising:
providing an aquarium filled with a liquid;
providing a perforated container and a handle that are configured to be selectively, magnetically linked to each other;
placing fish food within the perforated container;
placing the perforated container within the aquarium such that the perforated container is on the inside of the aquarium and the handle is on the outside of the aquarium such that the perforated container and the handle are magnetically linked to each other, and such that the liquid within the aquarium moistens the fish food within the perforated container and moves the fish food out of perforations in the perforated container; and
rotating the handle, thereby rotating the perforated container within the aquarium.

18. A method as recited in claim 17, further comprising cleaning the aquarium using the dispensing assembly.

19. A method for dispensing fish food within an aquarium filled with a liquid, comprising:
providing an aquarium filled with a liquid;
providing a perforated container and a handle that are configured to be selectively, magnetically linked to each other;
placing fish food within the perforated container; and
placing the perforated container within the aquarium such that the perforated container is on the inside of the aquarium and the handle is on the outside of the aquarium such that the perforated container and the handle are magnetically linked to each other, and such that the liquid within the aquarium moistens the fish food within the perforated container and moves the fish food out of perforations in the perforated container;

wherein the perforated container comprises a top soaking shield, which is not perforated.

20. A method as recited in claim 19 wherein the perforated container comprises a bottom soaking shield, which is not perforated.

21. A method for dispensing fish food within an aquarium filled with a liquid, comprising:
 providing an aquarium filled with a liquid;
 providing a perforated container and a handle that are configured to be selectively, magnetically linked to each other;
 placing fish food within the perforated container; and
 placing the perforated container within the aquarium such that the perforated container is on the inside of the aquarium and the handle is on the outside of the aquarium such that the perforated container and the handle are magnetically linked to each other, and such that the liquid within the aquarium moistens the fish food within the perforated container and moves the fish food out of perforations in the perforated container;
 wherein the perforated container comprises top and bottom soaking shields, which are not perforated, and further comprises a perforated section between the top and bottom soaking shields such that fish food can be dispensed from the perforated section, and
 further comprising:
  (A) allowing fish food in the perforated container to soak in the liquid and then
  (B) rotating the container such that food adjacent at least one of the top and bottom panels moves through the perforated section of the container.

22. A method for dispensing fish food within an aquarium filled with a liquid, comprising:
 providing an aquarium filled with a liquid;
 providing a perforated container and a handle that are configured to be selectively, magnetically linked to each other;
 placing fish food within the perforated container;
 placing the perforated container within the aquarium such that the perforated container is on the inside of the aquarium and the handle is on the outside of the aquarium such that the perforated container and the handle are magnetically linked to each other, and such that the liquid within the aquarium moistens the fish food within the perforated container and moves the fish food out of perforations in the perforated container;
 cleaning the aquarium using the dispensing assembly; and
 illuminating the aquarium using the dispensing assembly.

23. A method for dispensing fish food within an aquarium filled with a liquid, comprising:
 providing an aquarium filled with a liquid;
 providing a perforated container and a handle that are configured to be selectively, magnetically linked to each other;
 placing fish food within the perforated container;
 placing the perforated container within the aquarium such that the perforated container is on the inside of the aquarium and the handle is on the outside of the aquarium such that the perforated container and the handle are magnetically linked to each other, and such that the liquid within the aquarium moistens the fish food within the perforated container and moves the fish food out of perforations in the perforated container;
 cleaning the aquarium using the dispensing assembly;
 illuminating the aquarium using the dispensing assembly; and
 illuminating an area outside of the aquarium using the dispensing assembly.

24. A method for dispensing fish food within an aquarium filled with a liquid, comprising:
 providing an aquarium filled with a liquid;
 providing a perforated container and a handle that are configured to be selectively, magnetically linked to each other;
 placing fish food within the perforated container;
 placing the perforated container within the aquarium such that the perforated container is on the inside of the aquarium and the handle is on the outside of the aquarium such that the perforated container and the handle are magnetically linked to each other, and such that the liquid within the aquarium moistens the fish food within the perforated container and moves the fish food out of perforations in the perforated container; and
 closing a lid of the perforated container after the fish food has been placed therein.

\* \* \* \* \*